United States Patent Office 2,889,323
Patented June 2, 1959

2,889,323
NEW DYESTUFFS OF THE ANTHRAQUINONE SERIES

Robert Norman Heslop, Manchester, England, assignor to Imperial Chemical Industries Limited, London, England, a corporation of Great Britain No Drawing. Application January 17, 1957
Serial No. 634,622

Claims priority, application Great Britain
January 20, 1956

5 Claims. (Cl. 260—249)

This invention relates to new dyestuffs of the anthraquinone series and more particularly to new acid dyestuffs of the anthraquinone series for use in the dyeing of wool.

In British specification No. 467,815 there is described the manufacture of dyestuffs soluble in water, by causing a compound of the anthraquinone series, which contains at least one reactive amino-group to react with a cyanuric halide, or with a derivative thereof resulting from the substitution of one or two of its halogen atoms by another radical or radicals, the components being so selected that at least one of them contains at least one sulphonic or carboxylic acid group. As examples of compounds of the anthraquinone series which contain at least one amino group there are mentioned the compounds formed by condensing 1-amino-4-bromo-anthraquinone-2-sulphonic acid with 1:3-diaminobenzene or its sulphonic acid, 1:4-diaminobenzene, benzidine, benzidine disulphonic acid, diaminostilbene-disulphonic acid and p-diaminodiphenyl-amine.

According to the present invention there are provided new dyestuffs of the formula

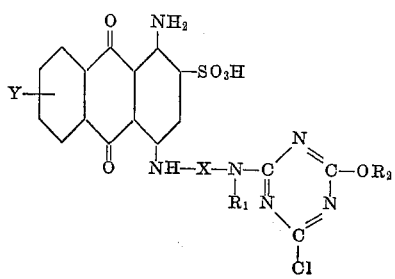

wherein $R_1$ stands for an alkyl or an aralkyl radical and $R_2$ stands for alkyl, cycloalkyl, aralkyl or aryl radical, Y stands for a sulphonic acid group or a hydrogen atom and X is a bridging group which may be substituted, provided that the dyestuff molecule contains not more than 2 sulphonic acid groups.

The radical $R_1$ may be for example, methyl, ethyl, propyl, butyl or benzyl and $R_2$ may be for example methyl, ethyl, propyl, butyl, cyclohexyl, benzyl or phenyl. The bridging group X may be for example substituted or unsubstituted phenylene, —$C_6H_4$—$C_6H_4$—, or $C_6H_4$—NH—$C_6H_4$— groups. As examples of substituents which may be present in these bridging groups there may be mentioned for example sulphonic acid groups, alkyl or alkoxy radicals or halogen atoms.

According to a further feature of our invention there is provided a process for the manufacture of new dyestuffs which comprises reacting cyanuric chloride with, in either order, equimolecular proportions of an anthraquinone derivative of the formula

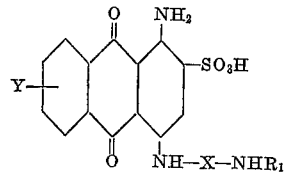

and a hydroxy compound of the formula $R_2OH$, preferably in the presence of acid binding agents, wherein X, Y, $R_1$ and $R_2$ have the meaning given above.

In a preferred feature of the invention, the cyanuric chloride is first reacted with the hydroxy compound, and the product so obtained is isolated and, if necessary, purified, before reacting with the anthraquinone derivative.

Suitable hydroxy compounds for use in the above process include, for example, methanol, ethanol, n- and iso-propanols, n-, iso- and t-butanols, cyclohexanol, benzyl alcohol, phenol, and o-, m-, and p-cresols.

The anthraquinone derivative used in the above process may be made by reacting the corresponding 1-amino-4-bromo-anthraquinone-2-sulphonic acid with an amino compound of the formula $NH_2$—X—$NHR_1$, or by reacting a 2:4-dibromo-1-aminoanthraquinone with an amino compound of this formula and treating the product so obtained with an alkali sulphite, for example sodium sulphite.

Thus to obtain the anthraquinone derivatives used in the process of the invention, there may be used, 1-amino-4-bromoanthraquinone-2-sulphonic acid itself, or for example, 1-amino-4-bromoanthraquinone-2:5- or 2:8-disulphonic acid or mixtures of these acids, and as well as 2:4-dibromo-1-aminoanthraquinone itself there may be used, for example 2:4-dibromo-1-aminoanthraquinone-6- or -7- sulphonic acid, or mixtures of these acids.

Suitable compounds of the formula $NH_2$—X—$NHR_1$ include, for example, p-methylaminoaniline, m-β-hydroxy-ethylaminoaniline, p-n-butylaminoaniline, 4-methylamino-3-sulphoaniline and 4-n-butylamino-3-sulphoaniline.

The new dyestuffs frequently separate from the reaction mixture at the end of the reaction, but where they remain in solution they may be precipitated conveniently by addition of an electrolyte, for example sodium chloride, potassium chloride or potassium acetate, and isolated by filtration and drying.

It has been found that the addition of buffers giving solutions of pH lying between 5 and 8, and especially those between 6 and 7, to the reaction mixture during precipitation or to the dyestuff pastes or powders, has a beneficial effect by reduction of side reactions, especially the removal by hydrolysis of the chlorine atoms attached to the triazine nucleus.

Suitable buffers for this purpose are mixtures of the mono- and di-alkali metal salts of phosphoric acid.

As acid binding agent there may be used, for example, sodium carbonate, caustic soda or caustic potash and in practice it is convenient to convert the hydroxy compound or sulphonic acid to its alkali metal salt before the reaction and no additional acid binding agent will then normally be required.

The new dyestuffs of the present invention are more soluble in water than the corresponding dyestuffs which contain no alkyl substituent on the nitrogen atom attached to the triazine ring. They have remarkably high affinity for wool which they dye from neutral or faintly acid dyebaths in reddish-blue to greenish-blue shades of high fastness to light and to washing. The dyestuffs of the present invention give much more level dyeings than the dyestuffs of similar solubility in water disclosed in British specification No. 467,815.

The invention is illustrated but not limited by the following examples in which the parts are by weight:

Example 1

A solution of 4 parts of 2:4-dichloro-6-methoxy-s-triazine in 20 parts of acetone is added gradually to a stirred mixture of 80 parts of water and 80 parts of crushed ice. The suspension so obtained is warmed to 30° C. and a solution containing 10.94 parts of the disodium salt of 1-amino-4-(4'-methylaminoanilino)-anthraquinone-2:3'-disulphonic acid in 250 parts of water, is added gradually over 1½ hours, the temperature of the reaction mixture being maintained at between 29° C. and 30° C. during the addition. The mixture is stirred for a further 1 hour at this temperature, and then cooled to 18° C. Sufficient 10% aqueous sodium carbonate solution is added gradually to make the reaction mixture neutral to litmus. Sufficient sodium chloride is then added to give a concentration of 240 grams per litre and the suspension so obtained is warmed to 33° C. and stirred for 15 minutes at this temperature. The suspension is cooled to 20° C. and filtered and the dyestuff on the filter is washed with 20% sodium chloride solution and finally dried at room temperature. The dyestuff dyes wool from neutral or faintly acid dyebaths in reddish-blue shades of good fastness to light and washing.

Example 2

A solution of 4 parts of 2:4-dichloro-6-methoxy-s-triazine in 20 parts of acetone is added gradually to a stirred mixture of 80 parts of water and 80 parts of crushed ice. The suspension so obtained is warmed to 20° C. and a solution of 8.9 parts of the sodium salt of 1-amino-4-(4'-methylamino)-anilinoanthraquinone-2-sulphonic acid in 300 parts of water is added gradually over 1 hour, the temperature of the reaction mixture being maintained between 19° C. and 21° C. during the addition. The mixture is stirred for a further 30 minutes at this temperature and then sufficient 10% aqueous sodium carbonate solution is added gradually to make the reaction mixture neutral to litmus. Sufficient sodium chloride is then added to give a concentration of 100 grams per litre and the suspension so obtained is stirred at 30° C. for 30 minutes. The suspension is cooled to 20° C. and filtered and the dyestuff on the filter is washed with 6% sodium chloride solution and finally dried at room temperature. The dyestuff dyes wool from neutral or faintly acid dyebaths in blue shades of good fastness to light and washing.

Example 3

A solution of 2.4 parts of 2:4-dichloro-6-methoxy-s-triazine in 12 parts of acetone is added gradually to a stirred mixture of 60 parts of water and 60 parts of crushed ice. The suspension so obtained is warmed to 30° C. and a solution of 7.2 parts of the disodium salt of 1-amino-4-(3' - β - hydroxyethylamino)anilinoanthraquinone - 2:5-disulphonic acid in 200 parts of water is added gradually over 40 minutes, the temperature of the reaction mixture being maintained between 28° C. and 30° C. during the addition. The mixture is stirred at this temperature for a further 1½ hours and then sufficient 10% aqueous sodium carbonate solution is added gradually to make the reaction mixture neutral to litmus. A solution of 2 parts of anhydrous disodium hydrogen phosphate and 4 parts of anhydrous potassium dihydrogen phosphate in 20 parts of water is added to the mixture and then sufficient sodium chloride is added to give a concentration of 140 grams per litre. The mixture is cooled to 15° C. and stirred until precipitation of the dyestuff is complete. The suspension is then filtered and the dyestuff on the filter is washed with a solution of 30 parts of sodium chloride, 3 parts of anhydrous disodium hydrogen phosphate and 6 parts of anhydrous potassium dihydrogen phosphate in 200 parts of water and finally dried at room temperature. The dyestuff dyes wool from neutral or faintly acid dyebaths in blue shades of good fastness to light and washing.

Example 4

A solution of 3.2 parts of 2:4-dichloro-6-phenoxy-s-triazine in 80 parts of acetone is stirred and diluted gradually with 50 parts of water. The solution obtained is warmed to 30° C. and a solution of 7.36 parts of the disodium salt of 1-amino-4-(4'-n-butylamino)-anilinoanthraquinone-2:3'-disulphonic acid in a mixture of 100 parts of water and 56 parts of acetone is added gradually over 1 hour, the temperature of the reaction mixture being maintained between 28° C. and 30° C. during the addition. The mixture is stirred at the same temperature for a further 1 hour and then sufficient 10% aqueous sodium carbonate solution is added gradually to make the mixture neutral to litmus. The mixture is cooled to 20° C. and a solution of 2 parts of anhydrous disodium hydrogen phosphate and 4 parts of anhydrous potassium dihydrogen phosphate in 20 parts of water is added followed by 15 parts of sodium chloride. The mixture is stirred for 15 minutes and then poured gradually into 630 parts of saturated sodium chloride solution with stirring. The suspension is stirred for 30 minutes, filtered and the dyestuff on the filter is washed with a solution of 40 parts of sodium chloride, 6 parts of anhydrous disodium hydrogen phosphate and 12 parts of anhydrous potassium dihydrogen phosphate in 400 parts of water and finally dried at room temperature.

The dyestuff dyes wool from neutral or faintly acid dyebaths in reddish-blue shades of good fastness to light and washing.

What I claim is:

1. Anthraquinone dyestuffs of the formula:

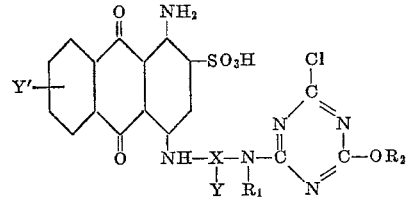

wherein $R_1$ stands for a member selected from the group consisting of benzyl and alkyl radicals of 1 to 4 carbon atoms, $R_2$ stands for a member selected from the group consisting of alkyl radicals of 1 to 4 carbon atoms, cyclohexyl, benzyl and monocyclic aryl hydrocarbon, Y and Y' stand for a member selected from the group consisting of a hydrogen atom and a sulfonic acid group where at least one Y is hydrogen, and X stands for a bridging group containing at least one and not more than two phenylene and phenylene radicals substituted by a group selected from the class consisting of sulfonic acid, lower alkyl and lower alkoxy radicals.

2. 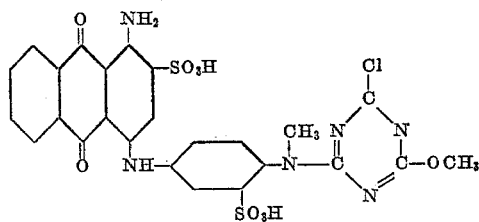

3. 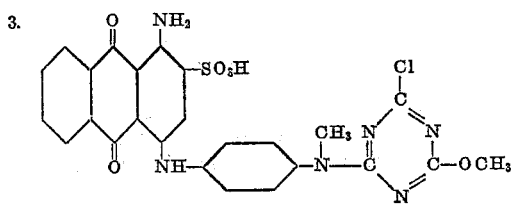

4. 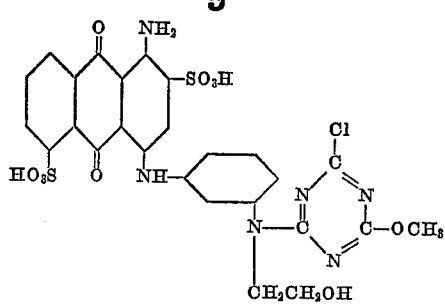
5. 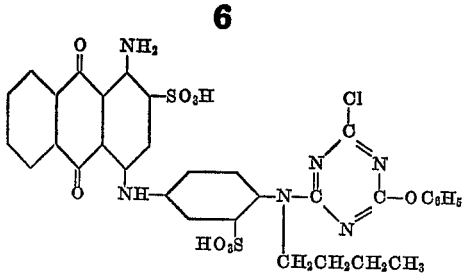
References Cited in the file of this patent
UNITED STATES PATENTS
2,773,871    Brassel et al. _____ Dec. 11, 1956
FOREIGN PATENTS
467,815     Great Britain _____ June 23, 1937